RE. 24850

March 4, 1958 A. J. DEVAUD 2,825,558

ELECTROSTATIC TAPE AND METHODS OF CONSTRUCTION

Filed April 25, 1955

INVENTOR
ALBERT J. DEVAUD
BY Elmer J. Gorn
ATTORNEY

United States Patent Office 2,825,558
Patented Mar. 4, 1958

2,825,558

ELECTROSTATIC TAPE AND METHODS OF CONSTRUCTION

Albert J. Devaud, Waltham, Mass., assignor, by mesne assignments, to Minneapolis-Honeywell Regulator Company, a corporation of Delaware Application April 25, 1955, Serial No. 503,752
15 Claims. (Cl. 271—2.3)

This invention relates to a tape and its method of construction, and more specifically, to a magnetic tape suitable for use in an electrostatic tape drive mechanism. A suitable tape drive mechanism has been fully disclosed in a copending application entitled, "Electrostatic Tape Drive" by Harold N. Beveridge, filed April 15, 1955, Serial No. 501,605.

This invention discloses how a first member and a second member, such as a capstan and a tape, arranged to produce relative motion with respect to each other, have said relative motion restrained by impressing an electrostatic force between said first member and said second member sufficient to frictionally engage said first member with said second member. The electrostatic tape referred to comprises a conductive member bonded on one side to a first nonconductive base member, a second nonconductive member bonded to the opposite side of said conductive member, magnetic material bonded to the side of said nonconductive base member opposite said conductive member, and a third nonconductive member bonded to said magnetic material. The capstan, or driving member, is constructed of a conductive member bonded to a nonconductive member.

The electrostatic clutch acts on the principle of the attraction of two plates of an electrically-charged condenser. The conductive member on the capstan acts as one plate and the conductive member on the tape acts as the second plate. It can be seen therefore, that, since the tape acts as one plate of an electrostatic clutch, that all moving masses and magnetic fields always needed in previous clutching mechanisms are eliminated, since the tape is acted upon directly.

In previous systems, the tape which is the second part of the electrostatic clutch, has been constructed of three elements, wherein a conductive member is bonded to a base dielectric member and magnetic material bonded to said conductive member. This particular tape had a very limited useful life due to the fact that the magnetic material could not be made to adhere properly and permanently to the conductive member. The tapes disclosed in this invention overcome this problem by always adhering the magnetic material to a nonconductive member.

It has also been discovered that the distance from the recording head to the magnetic material and the distance from the driving capstan to the conductive coating is extremely critical in that these referred-to distances must remain constant in order to obtain an even driving force between the capstan and the tape which is necessary to prevent the moving tape from causing a noise modulation signal to be induced in the recording head.

Further objects and advantages of this invention will be apparent as the description progresses, reference being made to the accompanying drawings, wherein.

Figure 1:
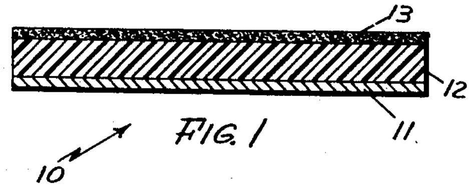
Fig. 1 is a cross section of an idealized three-element tape.

Referring now to Fig. 1, there is shown a three-element tape 10 consisting of a conductive member 11 bonded on one side to a nonconductive base member 12 and a magnetic material 13 bonded to the side of said nonconductive base member 12 opposite said conductive member 11. In the preferred embodiment, conductive member 11, consisting of either aluminum or silver, is flashed on to nonconductive base member 12. This particular three-element tape proved very satisfactory, since the magnetic material 13 was bonded directly to the nonconductive material 12, and, hence would stand up to large amounts of wear.

Figure 2:
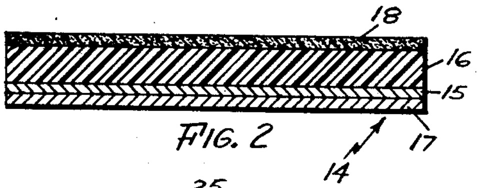
Fig. 2 is a cross section of an idealized four-element tape.

Four-element tape 14 referred to in Fig. 2 comprises a conductive member 15 bonded on one side to a first nonconductive member 16, a second nonconductive member 17 bonded to the opposite side of said conductive member 15, and magnetic material 18 bonded to the side of said first nonconductive base member 16 opposite said conductive member 15. The advantage of four-element tape 14 over the three-element tape 10 is that conductive member 15 is protected against external wear, since it never comes into direct contact with the driving capstan. Nonconductive members 16 and 17 are usually the same and preferably consist of a dielectric material, such as plastic. The magnetic materials 13 and 18 used in both the three and four-element tapes are preferably a magnetic oxide coating similar to the type used in present day magnetic tape recorders.

Figure 3:
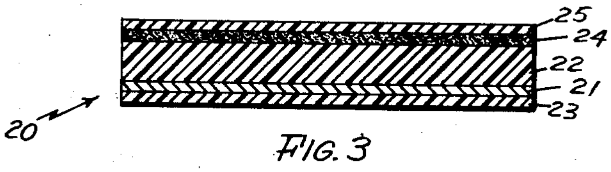
Fig. 3 is a cross section of an idealized five-element tape.

Referring now to Fig. 3, there is shown a five-element tape 20 comprising a conductive member 21 bonded on one side to a first nonconductive base member 22, a second nonconductive member 23 bonded to the opposite side of said conductive member 21, magnetic material 24 bonded to the side of said first nonconductive base member 22 opposite said conductive member 21, and a third nonconductive member 25 bonded to said magnetic material 24, the five-element tape 20 is improved over the four-element tape and the three-element tape in that both the conductive coating and the magnetic coating are protected by a nonconductive member. In the preferred embodiment, nonconductive members 22, 23 and 25 have all been constructed of the same material, such as plastic. A satisfactory five-element tape has been constructed having the following thicknesses:

| | From— | To— |
|---|---|---|
| | In. | In. |
| Conductive member 21 | 0.000005 | 0.00001 |
| Nonconductive base member 22 | 0.001 | 0.002 |
| Nonconductive member 23 | 0.00025 | 0.0005 |
| Magnetic material 24 | 0.0003 | 0.0007 |
| Nonconductive member 25 | 0.00025 | 0.0005 |

The five-element tape illustrated in Fig. 3 is an idealized representation since during the process of bonding one material to another and building the sandwich up to five elements, it has developed that each material, when it dries in the presence of air, may cause a wave-like surface on the bonded surface of the material which causes the magnetic coating and the conductive coating to have uneven portions recognized in the art as modules. It is believed that uneven tension of the extremely thin members and also air bubbles, dust, etc. cause the bonded material to develop these surface ripples. It as was discovery that has led to the improvement of the electrostatic tape drive, since it was previously thought erratic behavior of the electrostatic tape drive was due to some inherent defect in the mechanism itself. It has been determined that, for maximum efficiency in recording information and driving the tape, the members closest to the magnetic head and the members closest to the driving capstan must be as even as possible with a minimum of waves or other imperfections. This requirement is necessary to prevent all motion of the tape other than in the desired direction. If this requirement is neglected, it has been found that these other movements of the tape would modulate the information being recorded in magnetic material 24, thereby causing loss of signal, external noises, and possible erratic recording and driving of the electrostatic tape mechanism.

Figure 4:
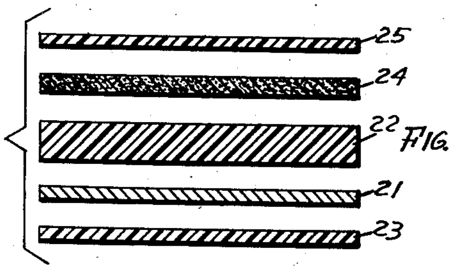
Fig. 4 is a series of drawings illustrating the five separate elements of the five-element tape illustrated in Fig. 3.
Figure 5:
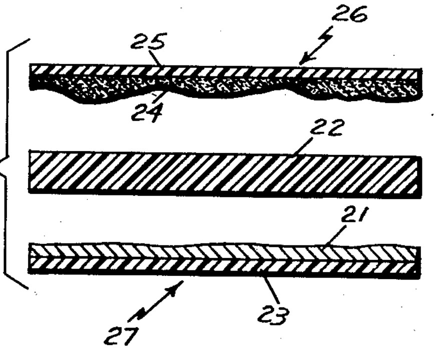
Fig. 5 is a series of drawings illustrating a step in the process of constructing a five-element tape.

Referring now to Fig. 4, there is shown a series of diagrams illustrating the five separate elements of the five-element tape before assembly. In the preferred method of constructing the five-element tape, nonconductive members 22, 23 and 25 are preformed as illustrated. Magnetic material 24 and conductive member 21 have such a small thickness that they are not preformed. The first step of operation consists in coating nonconductive member 25 with magnetic material 24 to form combined member 26, as illustrated in Fig. 5. Conductive member 21 is flashed on to nonconductive member 23 to form combined member 27. As mentioned previously, when magnetic material 24 bonds to nonconductive member 25, there is produced a wavy surface on that side of the magnetic material exposed to the air.

It will be observed that, for both the first combination 26, consisting of magnetic material 24 bonded to nonconductive member 25, and the second combination 27, consisting of conductive member 21 bonded to nonconductive member 23, the suface which is exposed to either the magnetic field or the electrostatic field is as smooth as the unadulterated surface of either nonconductive members 23 and 25. The next step necessary to completely form the five-element tape is to bond the first combination 26 to base member 22 in such a manner that magnetic material 24 contacts base member 22, and then bond the second combination 27 to base member 22 in such a manner that conductive member 21 contacts base member 22. Another method of completing the last step consists of bonding the first combined member 26 and bonding the second combined member 27 to the base material 22 in a simultaneous operation and in such a manner that magnetic material 24 and conductive coating 21 contacts base member 22.

Figures 6, 7:
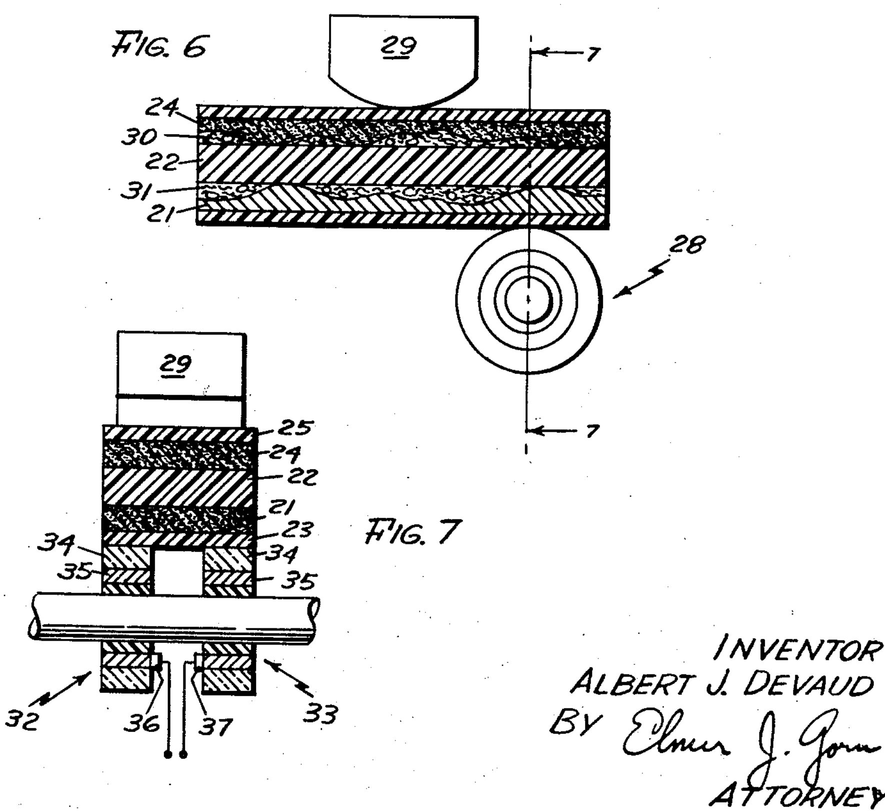
Fig. 6 illustrates a capstan and magnetic head with a practical five-element tape constructed in accordance with the principles of this invention.
Fig. 7 is section 7—7 of Fig. 6.

Referring now to Fig. 6, there is shown a completely assembled five-element tape in its correct relationship with a driving capstan 28 and a magnetic recording head 29. It will be observed that the necessary bonding material 30 and the various indicated impurities located between magnetic material 24 and base member 22 are outside the influence of magnetic head 29, and, hence cannot interfere with the flux linkages between the magnetic head and the magnetic material. In a similar manner, bonding material 31 and the various indicated impurities located between base member 22 and conductive member 21 are outside the electrostatic field developed between driving capstan 28 and conductive member 21.

The critical distance between magnetic head 29 and magnetic material 24 and the critical distance between driving capstan 28 and conductive member 21 are both maintained even over the length of the tape.

Referring now to Fig. 7, there is shown a cross section of a split driving capstan 32 and 33, each constructed of a nonconductive member 34 bonded to a conductive member 35. Brush assembly 36 and 37 makes contact with conductive member 35, thereby allowing a voltage to be impressed across nonconductive members 34, which, in turn, will frictionally engage the five-element tape to the split capstans 32 and 33 due to the electrostatic force generated.

This completes the description of the embodiment of the invention illustrated herein. However, many modifications and advantages thereof will be apparent to persons skilled in the art without departing from the spirit and scope of this invention. Accordingly, it is desired that this invetnion not be limited to the particular details of the embodiment disclosed herein, except as defined by the appended claims.

What is claimed is:

1. A tape comprising a non-magnetic conductive member having electrostatically attractive characteristics bonded on one side to a nonconductive base member, and magnetic material having substantially no electrostatically characteristics bonded to the side of said nonconductive base member opposite said conductive member.

2. A tape comprising a conductive metallic member having non-magnetic properties bonded on one side to a first nonconductive member, a second nonconductive member bonded to the opposite side of said conductive member, and magnetic material bonded to the side of said first nonconductive base member opposite said conductive member.

3. A tape comprising a non-magnetic conductive member bonded on one side to a first nonconductive base member, a second nonconductive member bonded to the opposite side of said conductive member, magnetic material bonded to the side of said first nonconductive base member opposite said conductive member, and a third nonconductive member bonded to said magnetic material.

4. A tape comprising a non-magnetic conductive member bonded on one side to a first dielectric base member, a second dielectric member bonded to the opposite side of said conductive member, magnetic material bonded to the side of said first dielectric base member opposite said conductive member, and a third dielectric member bonded to said magnetic material.

5. The method of constructing tape that consists in coating a non-magnetic conductive member to the surface of a first nonconductive member and coating a magnetic material on the surface of a second nonconductive member, and then bonding said first combination of conductive member and nonconductive member to a surface of a third nonconductive base member in such a manner that said conductive member contacts said third nonconductive member and bonding said second combination of magnetic material and nonconductive member to the opposite surface of said third nonconductive member in such a manner that said magnetic material contacts said third nonconductive member.

6. The method of constructing tape that consists in coating a non-magnetic conductive member to a surface of a first nonconductive member and coating a magnetic material to the surface of a second nonconductive member, and then simultaneously bonding said first combination of conductive member and nonconductive member and said second combination of magnetic material and nonconductive member to the opposite surfaces of a third nonconductive member in such a manner that said magnetic material and said conductive member contacts said third nonconductive member.

7. The method of constructing tape that consists in flashing a non-magnetic conductive member to a surface of a first nonconductive member and coating a magnetic material on the surface of a second nonconductive member, and then bonding said first combination of conductive member and nonconductive member to opposite surfaces of a third nonconductive base member in such a manner that said conductive member contacts said third nonconductive member and bonding said second combination of magnetic material and nonconductive member to said third nonconductive member in such a manner that said magnetic material contacts said third nonconductive member.

8. In combination, a driving member arranged to control the movement of a tape, said driving member comprising a non-magnetic conductive member bonded to a nonconductive member, said tape comprising a non-magnetic conductive member bonded on one side to a first nonconductive base member, a second nonconductive member bonded to the opposite side of said conductive member, magnetic material bonded to the side of said nonconductive base member opposite said conductive member, and a third nonconductive member bonded to said magnetic material, and means for frictionally engaging said capstan and said tape with each other by electrostatic force.

9. A tape for use in the recording of magnetic signals comprising a base member formed of a non-conductive plastic material having a first thickness dimension, a second member formed of a non-conductive plastic material having a thickness dimension substantially less than that of said base member, a magnetic recording material formed directly on one surface of said second member, and means bonding said second member to said base member so that said magnetic material is between said base and said second members.

10. A tape for use in the recording of magnetic signals comprising a base member formed of a non-conductive plastic material having a first thickness dimension, a second member formed of a non-conductive plastic material having a thickness dimension less than that of said base member, a conductive non-magnetic metallic material having a characteristic adapted for electrostatic attraction formed directly on one surface of said second member, and means bonding said second member to said base member so that said conductive material is between said base and second members.

11. An elongated flat tape adapted for the recording of magnetic signals comprising, in combination, a first non-conducting plastic strip having a thickness dimension of a first magnitude and adapted to have a driving force applied thereto by means adjacent one side thereof, a second non-conducting plastic strip having a thickness dimension of a second magnitude which is a fraction of the thickness magnitude of said first strip and is adapted to have a magnetic recording head adjacent one side thereof, and a layer of magnetic recording material sealed between the other sides of said first and second strips.

12. A tape as defined in claim 11 wherein said magnetic recording material is formed directly on the other side of said second strip and bonded by bonding means to the other side of said first strip.

13. An elongated flat tape adapted for the recording of magnetic signals comprising, in combination, a first non-conducting plastic strip having a thickness dimension of a first magnitude and forming the base member for said tape, a second non-conducting plastic strip having a thickness dimension of a second magnitude substantially less than that of said first strip, a magnetic material sealed between said first and second strips, a third non-conducting plastic strip having a thickness dimension of a third magnitude substantially less than that of said first strip, and a non-magnetic conducting material sealed between said first and third strips.

14. A tape for the recording of magnetic signals wherein the magnetic recording medium is adapted to present a smooth wear resistant surface to a magnetic data transfer head comprising a first tape member formed of a flat nonporous plastic member of uniform thickness whose surface is smooth on both sides, a layer of magnetic material formed directly on the smooth underside of said first tape member, and a second plastic tape member having said first tape and said magnetic material bonded thereto so that said magnetic material is sandwiched between said plastic members.

15. An elongated flat flexible tape adapted for the recording of magnetic signals comprising, in combination, a flexible plastic strip having a thickness dimension of a first magnitude and adapted to have a driving force applied thereto, a layer of magnetic recording material formed on the one side of said plastic strip, and a protective layer of flexible plastic material formed on said magnetic recording material to thereby sandwich the magnetic material between two plastic layers, said protective layer having a thickness dimension which is of a second magnitude which is a fraction of the thickness dimension of said plastic strip.

References Cited in the file of this patent

UNITED STATES PATENTS

| | | |
|---|---|---|
| 287,957 | Osborne | Nov. 6, 1883 |
| 1,706,941 | Pugh | Mar. 26, 1929 |
| 2,193,189 | Brooke | Mar. 12, 1940 |
| 2,258,106 | Bryce | Oct. 7, 1941 |
| 2,576,882 | Koole et al. | Nov. 27, 1951 |
| 2,647,750 | Camras | Aug. 4, 1953 |

FOREIGN PATENTS

| | | |
|---|---|---|
| 459,884 | Great Britain | Jan. 28, 1937 |
| 650,675 | Great Britain | July 9, 1946 |

U. S. DEPARTMENT OF COMMERCE

PATENT OFFICE

CERTIFICATE OF CORRECTION

Patent No. 2,825,558 March 4, 1958

Albert J. Devaud

It is hereby certified that error appears in the printed specification of the above numbered patent requiring correction and that the said Letters Patent should read as corrected below.

Column 3, line 6, for "It as was" read --It was this--; line 42, for "suface" read --surface--; column 4, line 2, for "makes" read --make--; line 13, for "invetnion" read --invention--; line 21, before "characteristics" insert --attractive--; line 71, for "on the" read -- on a--.

Signed and sealed this 6th day of May 1958.

(SEAL)
Attest:
KARL H. AXLINE

Attesting Officer

ROBERT C. WATSON
Commissioner of Patents